United States Patent
Watanabe

(10) Patent No.: US 6,893,082 B2
(45) Date of Patent: May 17, 2005

(54) SUSPENSION MOUNTING STRUCTURE

(75) Inventor: Shigeki Watanabe, Anjo (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 10/743,650

(22) Filed: Dec. 22, 2003

(65) Prior Publication Data

US 2004/0135046 A1 Jul. 15, 2004

(30) Foreign Application Priority Data

Dec. 26, 2002 (JP) ........................................ 2002-377468

(51) Int. Cl.$^7$ .............................................. B62D 25/20
(52) U.S. Cl. ..................... 296/204; 296/203.04; 296/30
(58) Field of Search ............................. 296/30, 203.01, 296/203.04, 204

(56) References Cited

U.S. PATENT DOCUMENTS

| | | | |
|---|---|---|---|
| 4,708,391 A | * | 11/1987 | Nakano ...................... 296/204 |
| 5,567,005 A | * | 10/1996 | Kosuge et al. ............... 296/204 |
| 6,270,152 B1 | * | 8/2001 | Sato ....................... 296/203.02 |
| 6,434,907 B1 | * | 8/2002 | Simboli ..................... 52/731.6 |

FOREIGN PATENT DOCUMENTS

JP  7-8164 U  2/1995

* cited by examiner

Primary Examiner—Dennis H. Pedder
(74) Attorney, Agent, or Firm—Rossi, Kimms & McDowell

(57) ABSTRACT

A vehicle suspension mounting structure capable of sufficiently improving the strength and rigidity of a strut fixing part, while minimizing adverse effects such as increased vehicle weight. Side members of a sectional shape having an upper opening are curved inward in the vehicle width direction so as not to interfere with strut mounting faces. Notched portions are formed to extend from the strut mounting faces to outer side faces of the side members, and brackets made of a thick plate to which upper portions of struts are fixed are disposed in the notched portion and spot welded thereto.

10 Claims, 3 Drawing Sheets

VEHICLE FRONT

SUSPENSION MOUNTING STRUCTURE

CROSS-REFERENCE TO RELATED ART

This application incorporates by reference the subject matter of Application No. 2002-377468, filed in Japan on Dec. 26, 2002, on which a priority claim is based under 35 U.S.C § 119(a).

BACKGROUND OF THE INVENTION

1. Technical Field

The present invention relates to a suspension mounting structure, and more particularly, to a vehicle rear suspension mounting structure for mounting an upper portion of a rear strut to a vehicle body.

2. Related Art

There has been proposed a rear suspension mounting structure for mounting lower portions of struts each constituted by a coil spring, a shock absorber, etc. To right and left vehicle suspension arms and for mounting upper portions of the struts right above the suspension arms (see, JP-U-7-8164 for instance, which will be hereinafter referred to patent publication 1).

In the rear suspension mounting structure disclosed in patent publication 1, a side member formed into a U-shape in section and having an upper opening extends in the vehicle longitudinal direction, and is curved inward in the vehicle width direction so as not to interfere with the strut fixing part. From the curved portion of the side member, a strut mounting face serving as strut fixing part extends outward in the vehicle width direction, to which an upper portion of the strut is fixed.

In the rear suspension mounting structure disclosed in patent publication 1, the strut mounting face that receives a force input from the strut during vehicle running is constituted by a flat plate having a relatively wide area, making it difficult to ensure the strength and rigidity of the strut mounting face. To ensure the strength and rigidity, the thickness of the flat plate constituting the strut mounting face must be increased, resulting in adverse effects such as increased vehicle weight.

SUMMARY OF THE INVENTION

An object of the present invention is to provide a suspension mounting structure capable of sufficiently improving the strength and rigidity at the strut fixing part, while minimizing adverse effects such as increased vehicle weight.

A suspension mounting structure of this invention comprises a side member including a curved portion formed into a U-shape in section and having an upper opening, the curved portion being curved inward in a vehicle width direction, a horizontal face portion extending outwardly from an upper end of the curved portion in the vehicle width direction, and a notched portion formed to extend from a part of the horizontal face portion to an outer side face, as viewed in the vehicle width direction, of the curved portion; and a bracket including an upper face portion and a side face portion that are disposed at the notched portion to cover the horizontal face portion and the outer side face of the curved portion, respectively, an upper portion of a strut of a suspension being fixed to the upper face portion.

DETAILED DESCRIPTION

Figure 1:
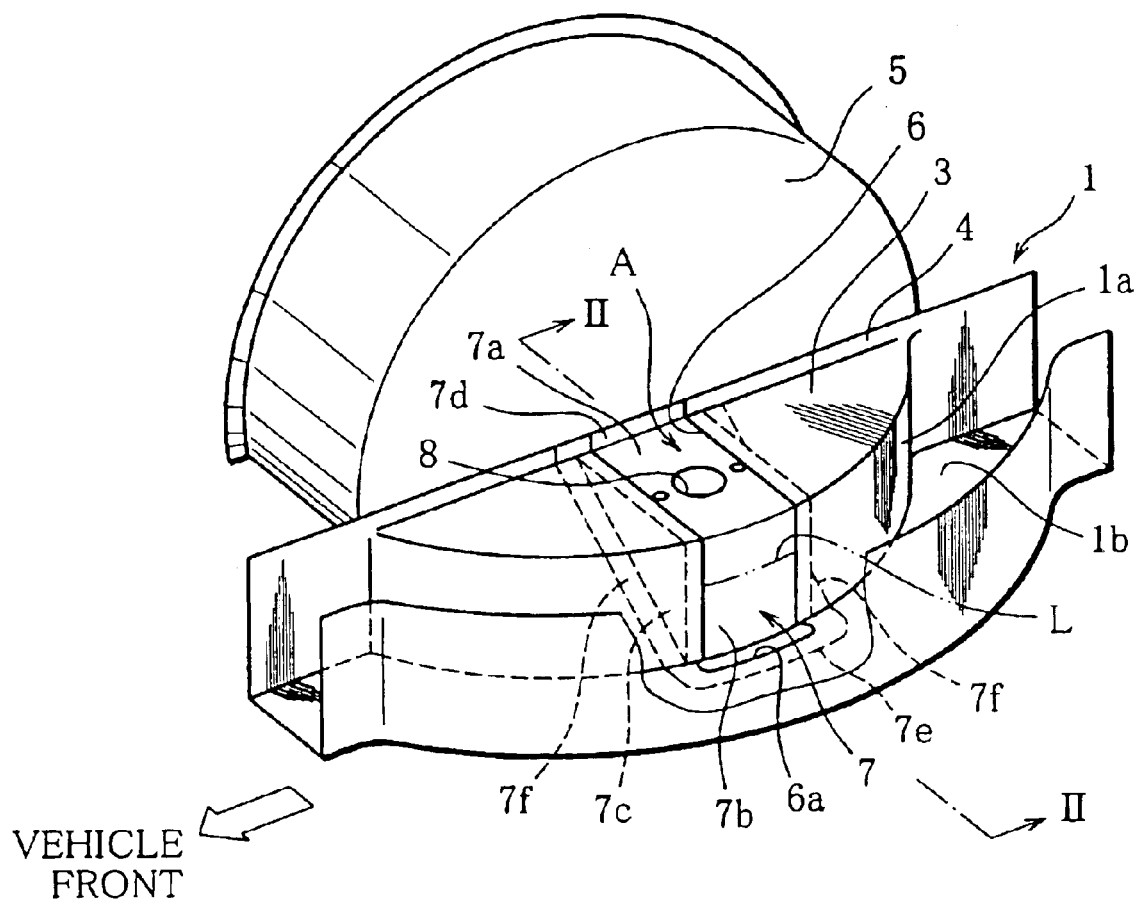
FIG. 1 is a perspective view of a vehicle rear suspension mounting structure according to an embodiment of this invention.
Figure 2:
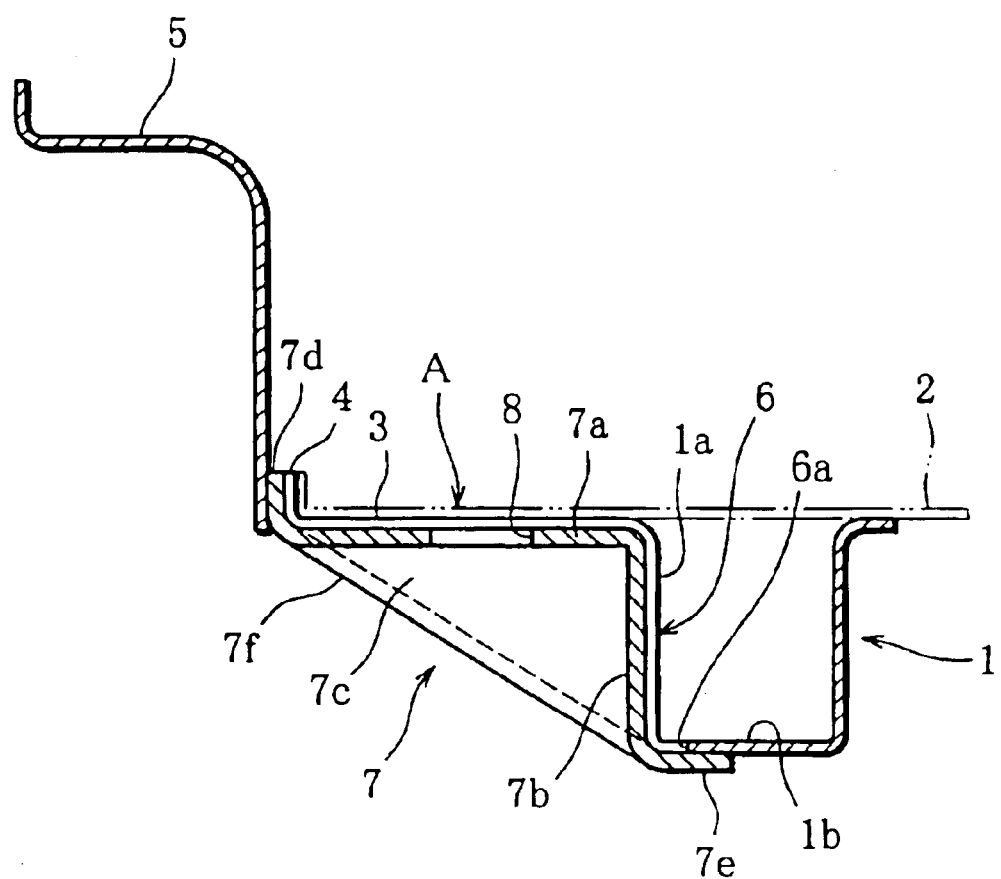
FIG. 2 is a sectional view, taken along line II—II in FIG. 1, of the rear suspension mounting structure.
Figure 3:
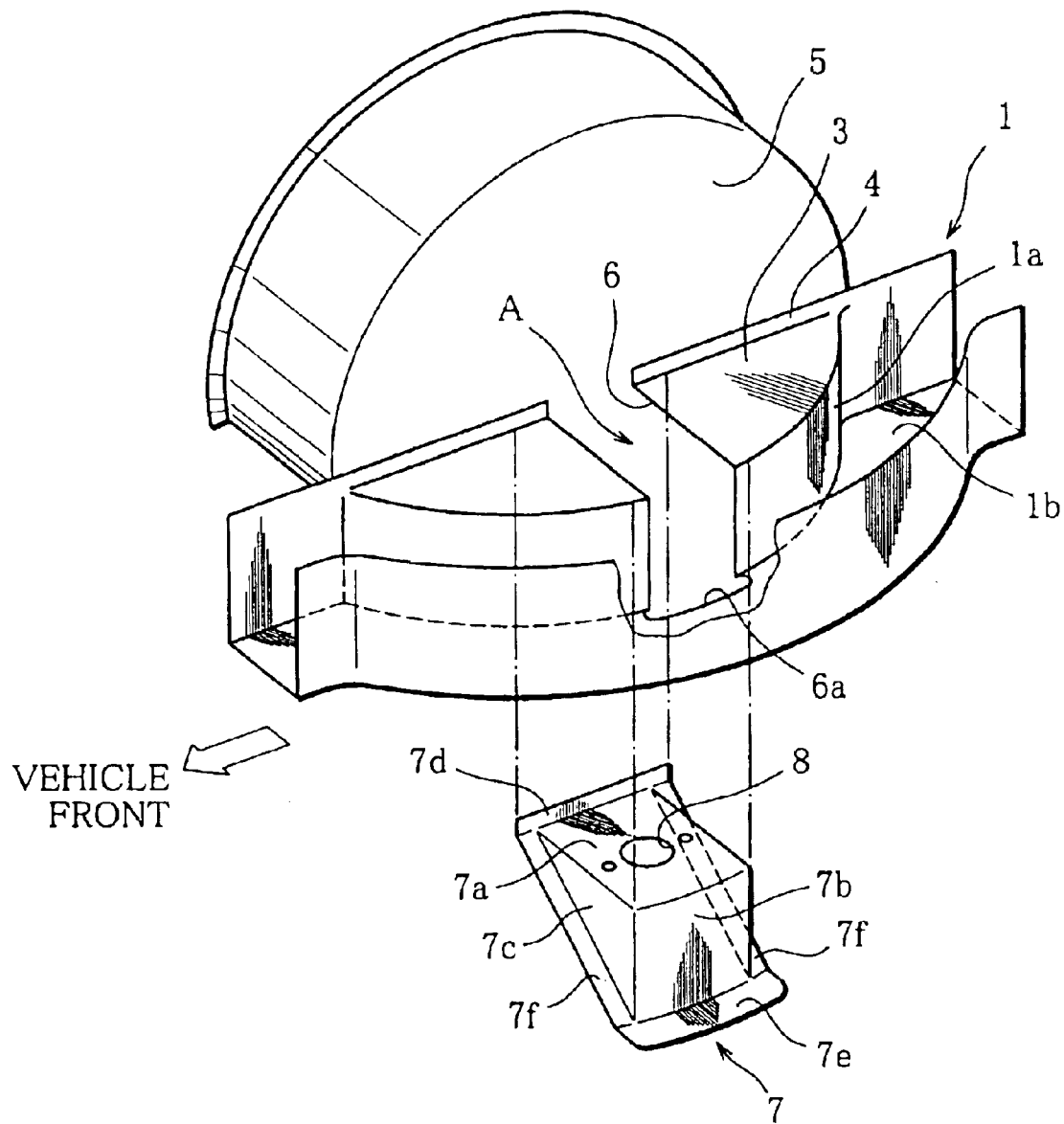
FIG. 3 is an exploded perspective view of the rear suspension mounting structure.

With reference to FIGS. 1–3, a vehicle rear suspension mounting structure according to one embodiment of this invention will be explained.

In FIGS. 1–3, a strut fixing part A in a right rear suspension of a vehicle is shown. Side members 1 (only the right side member is shown in FIGS. 1–3) are respectively provided on the both sides of a vehicle, as viewed in the vehicle width direction, so as to extend in the vehicle longitudinal direction, and disposed under a vehicle floor 2 (shown in FIG. 2). Each side member 1 is constituted by an outer wall 1a, an inner wall, and a bottom wall 1b (hereinafter, they will sometimes be referred to as outer side face, inner side face, and bottom face, respectively), and is formed into a U-shape in section having an upper opening which is closed by the floor 2.

The side member 1 is curved inward in the vehicle width direction so as not to interfere with the strut fixing part A. Specifically, in the vicinity of the strut fixing part A, the side member 1 includes a curved portion, and a horizontal wall portion 3 extending outwardly from an upper end of the outer wall 1a in the vehicle width direction. The horizontal wall portion 3 is formed into a half-moon shape as viewed in plan, and constitutes a strut mounting face. Hereinafter, the horizontal wall portion 3 will sometimes be referred to as horizontal face portion or strut mounting face. The horizontal wall portion or strut mounting face 3 is constituted by a flat plate, and is press formed integrally with the curved portion of the side member. The strut mounting face 3 extends at substantially right angles with respect to an outer side face 1a of the curved portion. An outer part, as viewed in the vehicle width direction, of the strut mounting face is bent upward at right angles to constitute a flange portion 4 to which a wheel apron 5 is spot welded. Although not shown, a rear tire is accommodated in the wheel apron 5.

At intermediate portions, as viewed in the vehicle longitudinal direction, of the strut mounting faces 3, the right and left side members 1 are individually formed with notched portions 6 for bracket mount of the same longitudinal width. The notched portion 6 is open to the side of the wheel apron 5 on the strut mounting face 3, and extends across the strut mounting face 3 in the vehicle width direction to reach the outer face 1a of the side member 1. Further, the notched portion 6 extends across the outer face 1a in the vertical direction to reach the bottom face 1b at which it constitutes a relief portion 6a that slightly expands in the vehicle longitudinal direction.

At the notched portion 6, the bracket 7 for the strut fixing is disposed from below, so that the notched portion 6 may be covered from below by the bracket 7. The bracket 7 has a plate thickness greater than that of the side member 1, especially than that of the flat plate constituting the strut mounting face 3. The side member 1 is as a whole comprised of an upper wall or upper face 7a corresponding to the strut mounting face 3, a side wall or side face 7b corresponding to the outer side face 1a of the side member 1, and a pair of triangular end walls (gussets) or end faces 7c respectively provided on the front and rear sides of the upper and side faces 7a, 7a. The upper wall, side wall, and end walls of the bracket are press formed into one piece.

An outer part, as viewed in the vehicle width direction, of the upper face or upper wall 7a of the bracket 7 is bent to constitute an upper flange portion 7d that is formed so as to correspond to the flange portion 4 of the strut mounting face 3. A lower part of the side face or side wall 7b is bent to constitute a lower flange portion 7e formed to correspond to the lower face 1b of the side member 1. The front and rear gussets 7c are bent at right angles to form ribs 7f. Thus, the flange portions 7d, 7e and the ribs 7f are formed in continuity with the main body 7a, 7b, 7c of the bracket 7.

The bracket 7 has a longitudinal size slightly larger than that of the notched portion 6. Front and rear edges of the bracket 7 (specifically, front and rear edges of the upper face 7a, side face 7b, and upper flange portion 7d) and front and rear edges of the notched portion 6 (specifically, parts corresponding to the strut mounting face 3, the outer side face 1a of the side member 1, the flange portion 4 of the strut mounting face 3) overlap one another and are spot welded to one another at intervals of a predetermined pitch. The lower flange portion 7e of the bracket 7 overlaps the bottom face 1b of the side member 1 so as to close the relief portion 6a of the notched portion 6, and is spot welded to the bottom face 1b at intervals of a predetermined pitch, whereby the bracket 7 is joined to the strut mounting face 3.

The notched portion 6 is configured to reduce a contact area between the bracket 7 and the strut mounting face 3 and between the bracket 7 and the outer side face 1a of the side member 1, thereby reducing the sound of a creak which would be produced when the vehicle body is flexed in a case where the contact area between these members 7, 3, 1a is large.

The strut mounting face 3 is formed with a strut mounting hole 8 which is used to fix upper portions of a coil spring, a shock absorber, etc. that constitute a strut, whereas lower portions of these elements are mounted to a suspension arm. During vehicle running, cushioning and damping functions are achieved by the coil spring and the shock absorber, and a force input from these elements acts on the strut mounting face 3.

At this time, the force input concentratedly acts on the bracket 7 to which the strut is directly fixed. However, the bracket 7 that is a separate component independent of the strut mounting face 3 is capable of withstanding the force input from the strut, as will be described below.

First, a plate thickness of the bracket 7 can be determined independently of that of the strut mounting face 3 (i.e., the side member 1). Thus, only the plate thickness of the bracket 7 can be increased to improve the strength and rigidity, without increasing a plate thickness of the entire side member 1 including the strut mounting face 3.

As for the strut mounting face 3 constituted by a flat plate having a relatively wide area so that it is disadvantageous in strength and rigidity, the shape of the bracket 7 can arbitrarily be determined to have an advantage of strength and rigidity. Specifically, the bracket 7 is formed with front and rear gussets (end walls) 7c capable of preventing the upper face 7a and side face 7b from being deformed to expand when a force input from the strut is applied. In addition, these gussets 7 are reinforced by the ribs 7f, and disposed closely behind and in front of a part to which the force input from the strut is applied, thus effectively achieving a deformation preventive function, so that a deformation of the bracket 7 can be prevented with reliability.

By designing the bracket 7 to have an appropriate plate thickness and shape, while minimizing adverse effects such as increased vehicle weight which would be caused if the plate thickness of the entire side member 1 is increased, the strength and rigidity of the strut fixing part A in the vehicle can be sufficiently improved.

Moreover, since the side face 7b of the bracket is formed to extend to the bottom face 1b of the side member 1, so as to be joined to the bottom face 1b through the lower flange portion 7e, and the notched portion 6 is formed to extend to the bottom face 1b of the side member 1 as with the side face 7b of the bracket 7, the following advantages can be attained.

First, in the aforementioned arrangement where the side face 7b of the bracket 7 is extended, the gussets 7c are also extended downward so that their deformation preventive function can be maximized. This greatly contributes to the prevention of deformation of the bracket 7 and, by extension, to the improvement in strength and rigidity of the strut fixing part A.

When the side face 7b of the bracket 7 is extended, a contact area between the side face 7b and the outer side face 1a of the side member 1 inevitably increases, making the sound of a creak liable to be produced when the vehicle body is flexed. However, in this embodiment, the notched portion 6 is also extended to the bottom face 1b of the side member 1 to correspond to the side face 7b of the bracket 7. Thus, the contact area between the side face 7b and the outer side face 1a is prevented from increasing, whereby the sound of a creak can advantageously be suppressed. In addition, the enlargement of area of the notched portion 6 permits a reduction in vehicle weight.

In the above, the preferred embodiment has been described. The present invention is not limited to the foregoing embodiment. For instance, the bracket 7 is constituted by the upper face 7a, the side face 7b and the gussets 7c in the embodiment, and the front and rear edges of the bracket 7 are overlapped to those of the notched portion 6 from below and spot welded thereto. However, the shape and fixing structure of the bracket 7 are not limited to the just-mentioned ones. The shape of the bracket 7 may be altered by for example omitting the ribs 7 from the bracket 7, and the bracket 7 may be joined to the notched portion 6 from above. The side face 7b of the bracket 7 and the notched portion 6 are not inevitably necessary to be extended to the bottom face 1b of the side member 1. Alternatively, they may be terminated at an intermediate height position in the outer side face 1a of the side member 1, as shown by way of example by a two-dotted chain line L in FIG. 1.

In the embodiment, the plate thickness of the bracket 7 is determined to be greater than that of the side member 1. Alternatively, the bracket 7 may be constituted by a material having a higher strength and rigidity than those of a constituent material for the side member 1.

In the embodiment, respective upper portions of a coil spring and a shock absorber are fixed to the bracket 7. Alternatively, only the upper portion of the shock absorber may be fixed to the bracket 7, with the upper portion of the coil spring fixed to another part. Even in this case, a force input from the shock absorber concentratedly acts upon the bracket 7, and advantages similar to those of the embodiment can be achieved.

Although the case where the present invention is applied to a rear suspension has been described in the embodiment, this invention is also applicable to a front suspension.

What is claimed is:

1. A suspension mounting structure, comprising:
   a side member including a curved portion formed into a U-shape in section and having an upper opening, the curved portion being curved inward in a vehicle width direction, a horizontal face portion extending outwardly from an upper end of the curved portion in the vehicle width direction, and a notched portion formed to extend from a part of the horizontal face portion to an outer side face, as viewed in the vehicle width direction, of the curved portion; and a bracket including an upper face portion and a side face portion that is disposed to fill the notched portion at the horizontal face portion and the outer side face of the curved portion, respectively.

2. The suspension mounting structure according to claim 1, wherein said bracket is configured to cover said notched portion from below said horizontal face portion.

3. The suspension mounting structure according to claim 2, wherein said curved portion has a bottom face thereof formed with a notch-like relief portion that extends from said notched portion in continuity therewith.

4. The suspension mounting structure according to claim 3, wherein said bracket is formed with a lower flange portion that covers said relief portion from below the bottom face of said curved portion.

5. The suspension mounting structure according to claim 2, wherein said bracket has a triangular end face that connects an outer part, as viewed in the vehicle width direction, of said upper face portion to a lower part of said side face portion.

6. The suspension mounting structure according to claim 5, wherein a rib is formed to extend in a vehicle longitudinal direction in continuity with the side face portion of said bracket.

7. The suspension mounting structure according to claim 6, wherein said rib is formed in continuity with the lower flange portion of said bracket.

8. The suspension mounting structure according to claim 7, wherein a flange portion is provided at an outer end, as viewed in the vehicle width direction, of the horizontal face portion of said side member so as to project upward, and an upper flange portion, corresponding to the flange portion of said side member, is provided at an outer end, as viewed in the vehicle width direction, of the upper face portion of said bracket.

9. The suspension mounting structure according to claim 8, wherein said rib is formed in continuity with said upper flange portion.

10. The suspension mounting structure according to claim 2, wherein said bracket is formed to have a thickness greater than that of said horizontal face portion.

* * * * *